United States Patent
Yehezkel et al.

(10) Patent No.: US 12,261,818 B2
(45) Date of Patent: Mar. 25, 2025

(54) SYSTEM AND METHOD OF DISCOVERING A NETWORK ASSET FROM A NETWORK SAMPLE

(71) Applicant: TWEENZNET LTD., Tel Aviv-Jaffa (IL)

(72) Inventors: Aviv Yehezkel, Ramat-Gan (IL); Eyal Elyashiv, Ramat Hasharon (IL)

(73) Assignee: TWEENZNET LTD., Tel Aviv-Jaffa (IL)

(*) Notice: Subject to any disclaimer, the term of this patent is extended or adjusted under 35 U.S.C. 154(b) by 0 days.

(21) Appl. No.: 18/346,803

(22) Filed: Jul. 4, 2023

(65) Prior Publication Data

US 2024/0015134 A1 Jan. 11, 2024

Related U.S. Application Data

(60) Provisional application No. 63/358,552, filed on Jul. 6, 2022.

(51) Int. Cl.
*H04L 61/4541* (2022.01)
*H04L 61/4511* (2022.01)

(52) U.S. Cl.
CPC ...... *H04L 61/4541* (2022.05); *H04L 61/4511* (2022.05)

(58) Field of Classification Search
CPC ....... H04L 67/51; H04L 41/12; H04L 43/045; H04L 61/4541; H04L 41/5058; H04L 61/4523; H04L 43/026; H04L 47/2441
See application file for complete search history.

(56) References Cited

U.S. PATENT DOCUMENTS

| | | | | |
|---|---|---|---|---|
| 9,489,154 B1 * | 11/2016 | Haapanen | ............. | G06F 3/1236 |
| 9,847,965 B2 * | 12/2017 | Hugard, IV | ............ | H04L 63/20 |
| 10,171,318 B2 * | 1/2019 | Pon | ........................ | H04L 43/045 |
| 10,320,619 B2 * | 6/2019 | Seddigh | .............. | H04L 41/0213 |
| 11,115,799 B1 * | 9/2021 | Du | ........................ | H04L 63/205 |
| 11,212,183 B1 * | 12/2021 | Hankins | .............. | G06F 9/30036 |
| 11,216,889 B1 * | 1/2022 | Gray | ....................... | G06V 20/20 |

(Continued)

OTHER PUBLICATIONS

N. Msadek, R. Soua and T. Engel, "IoT Device Fingerprinting: Machine Learning based Encrypted Traffic Analysis," 2019 IEEE Wireless Communications and Networking Conference (WCNC), Marrakesh, Morocco, 2019, pp. 1-8, doi: 10.1109/WCNC.2019.8885429. (Year: 2019).*

(Continued)

*Primary Examiner* — Alex H. Tran
(74) *Attorney, Agent, or Firm* — PEARL COHEN ZEDEK LATZER BARATZ LLP

(57) ABSTRACT

Systems and methods of discovering computer network assets, including: identifying, by a processor, in sampled traffic over at least one computer network, an internet protocol (IP) address of a node communicating over at least one port, wherein the at least one port is associated with an asset type, determining, by the processor, a volume of traffic associated with the IP address of the node communicating over the at least one port, discovering, by the processor, the IP address of the node as belonging to an asset of the asset type, based on the volume of traffic exceeding a dynamic threshold, and adding the asset, by the processor, to a list of discovered assets.

18 Claims, 4 Drawing Sheets

(56) References Cited

U.S. PATENT DOCUMENTS

| | | | |
|---|---|---|---|
| 11,616,793 B2* | 3/2023 | Fry | H04L 41/046 |
| | | | 726/23 |
| 2012/0226807 A1* | 9/2012 | Panella | H04L 41/12 |
| | | | 709/224 |
| 2017/0317899 A1* | 11/2017 | Taylor | H04L 69/325 |
| 2019/0281072 A1* | 9/2019 | Al Khater | H04L 63/1408 |
| 2021/0105304 A1* | 4/2021 | Kraning | G06F 16/2379 |
| 2022/0255805 A1* | 8/2022 | Hausermann | G06N 20/00 |

OTHER PUBLICATIONS

J. Thom, N. Thom, S. Sengupta and E. Hand, "Smart Recon: Network Traffic Fingerprinting for IoT Device Identification," 2022 IEEE 12th Annual Computing and Communication Workshop and Conference (CCWC), Las Vegas, NV, USA, 2022, pp. 0072-0079 , doi: 10.1109/CCWC54503.2022.9720739. (Year: 2022).*

Dong, Shuaike, et al. 'Your Smart Home Can't Keep a Secret: Towards Automated Fingerprinting of IoT Traffic with Neural Networks'. arXiv [Cs.CR], 2019, http://arxiv.org/abs/1909.00104. arXiv. (Year: 2019).*

* cited by examiner

SYSTEM AND METHOD OF DISCOVERING A NETWORK ASSET FROM A NETWORK SAMPLE

CROSS REFERENCE TO RELATED APPLICATION

This application claims benefit of Provisional Application No. 63/358,552, filed Jul. 6, 2022, which is incorporated herein by reference.

FIELD OF THE INVENTION

The present invention relates to computer networks. More specifically, the present invention relates to systems and methods of discovering computer network assets from network traffic samples.

BACKGROUND

Computer networks have different kinds of endpoints: assets providing a core service in the network, servers providing a service to nodes that are internal to the network or nodes that are external to the network, workstations that users work on, etc. A node may be a server, workstation or computing device, or any device which is connected to the network and is capable of communicating over the network, such as a laptop, mobile phone, a smart watch, or any other wearable communication device.

In TCP/IP (Transmission Control Protocol/Internet Protocol) networks, assets may include, for example, servers such as DNS (domain name system), NTP (network time protocol), email, DHCP (Dynamic Host Configuration Protocol) and AD (Active Directory) servers. Other asset types may include web servers and file sharing servers. Other endpoint types may include workstations and virtual machines.

In cloud networks, asset types may include, for example, data bases running on virtual machines. A virtual machine is the digital version of a physical computing device that can run on remote servers or the cloud. Like a physical machine, it can run an operating system, store data, connect to networks, and perform computing functions.

DNS is used for resolving domain-names to their actual IP addresses to allow communications outside the internal computer network. For example, when a user wants to browse the website www.example.com, the user's workstation will request the internal DNS server to provide the IP address associated with the website. If the DNS server is not aware of this IP address already, it will ask a higher-level DNS server, such as Google™ DNS 8.8.8.8.

NTP is used to synchronize the time with the workstation, such that its processes can determine the exact time for functioning correctly.

TCP/IP provides a reliable, flexible email system built on a few basic protocols. These include protocols such as Simple Mail Transfer Protocol (SMTP), which is the TCP/IP mail delivery protocol. It moves mail across the Internet and across the local or internal network.

DHCP is a protocol that automatically provides an Internet Protocol (IP) node with its IP address and other related configuration information.

Web servers are XML-based information exchange systems that use the Internet for direct application-to-application interaction. These systems can include programs, objects, messages, or documents. A web service is a collection of open protocols and standards used for exchanging data between applications or systems.

A file server is a computer responsible for the storage and management of data files so that other computers on the same network can access the files. It enables users to share information over a network without having to physically transfer files.

An AD (Active Directory) server provides a database and set of services that provides users with critical information about the network, including what users and workstations there are and their permissions.

In TCP/IP networks, an IP address identifies a device or node in a network and is used to determine the destination of a data packet. Port numbers identify a particular application or service on a system, such as DNS (port 53), NTP (port 123) and similarly for DHCP, email, file sharing, etc.

Discovering assets in a network is usually done by manually analyzing network traffic and maintaining architecture diagrams and spreadsheets. This is a time-consuming and inefficient process.

SUMMARY OF THE INVENTION

There is thus provided, in accordance with some embodiments of the invention, a method of discovering computer network assets, the method including: identifying, by a processor, in sampled traffic over at least one computer network, an internet protocol (IP) address of a node communicating over at least one port, wherein the at least one port is associated with an asset type, determining, by the processor, a volume of traffic associated with the IP address of the node communicating over the at least one port, discovering, by the processor, the IP address of the node as belonging to an asset of the asset type, based on the volume of traffic exceeding a dynamic threshold, and adding the asset, by the processor, to a list of discovered assets.

In some embodiments, the discovering based on the volume of traffic is based on the volume of internal communication over the at least one port associated with the asset type that exceeds a port threshold. In some embodiments, the port threshold is determined, by the processor, based on a ratio between the volume of traffic through the port and the total volume of traffic through other ports. In some embodiments, the dynamic threshold is determined, by the processor, based on the total volume of traffic over the computer network and based on the asset type.

In some embodiments, the processor detects an anomaly based on detecting an asset communicating over at least one port not associated with the asset type of the asset. In some embodiments, the processor detects an anomaly based on detecting an internal IP address of a node using an asset configured for external communication. In some embodiments, the processor detects an anomaly based on detecting an external IP address of a node using an asset configured for internal communication.

In some embodiments, the processor detects an anomaly based on detecting an internal IP address of a node communicating over at least one port configured for external communication. In some embodiments, the processor detects an anomaly based on detecting an external IP address of a node communicating over at least one port configured for internal communication.

In some embodiments, adding the asset, by the processor, to the list of discovered assets includes: adding the IP address of the asset and the asset type to the list of discovered assets. In some embodiments, adding an asset, by the processor, to the list of discovered assets includes: adding the IP address of the asset and a list of at least one server port, wherein the volume of traffic of the asset over the at least one server port exceeds the dynamic threshold. In some embodiments, the processor adds to the list of discovered assets, an IP address of at least one subnetwork in communication with the server over the at least one server port, a volume of outbound traffic over the at least one server port, a volume of inbound traffic over the at least one server port and a volume of internal traffic over the at least one server port, wherein the volume of traffic between the server and the at least one subnetwork exceeds the dynamic threshold.

There is thus provided, in accordance with some embodiments of the invention, a system for discovering computer network assets, including: a processor configured to: identify in sampled traffic over at least one computer network, an internet protocol (IP) address of a node communicating over at least one port, wherein the at least one port is associated with an asset type, determine a volume of traffic associated with the IP address of the node communicating over the at least one port, discover the IP address of the node as belonging to an asset of the asset type, based on the volume of traffic exceeding a dynamic threshold, and add the asset to a list of discovered assets.

In some embodiments, the processor is configured to discover the IP address of the node as belonging to an asset of the asset type, based on the volume of traffic exceeding a dynamic threshold, based on the volume of internal communication over the at least one port associated with the asset type that exceeds a port threshold. In some embodiments, the processor is configured to determine the port threshold, based on a ratio between the volume of traffic through the port and the total volume of traffic through other ports. In some embodiments, the processor is configured to determine the dynamic threshold, based on the total volume of traffic over the computer network and based on the asset type.

In some embodiments, the processor is configured to detect an anomaly based on detecting at least one of: an asset communicating over at least one port not associated with the asset type of the asset, an internal IP address of a node using an asset configured for external communication, an external IP address of a node using an asset configured for internal communication. In some embodiments, the processor is configured to detect an anomaly based on detecting at least one of: an internal IP address of a node communicating over at least one port configured for external communication, and an external IP address of a node communicating over at least one port configured for internal communication. In some embodiments the processor is configured to add an asset to the list of discovered assets, including: adding the IP address of the asset and a list of at least one server port, wherein the volume of traffic of the asset over the at least one server port exceeds the dynamic threshold There is thus provided, in accordance with some embodiments of the invention, a method of determining computer network assets, the method including: sampling, by a processor, traffic over a computer network, determining, by the processor, an internet protocol (IP) address of a node communicating over a port in the sampled traffic, wherein the at least one port is associated with an asset type, checking, by the processor, if a volume of traffic associated with the IP address of the node communicating over the at least one port is exceeding a dynamic threshold, and adding the asset, by the processor, to a list of discovered assets based on determination of the IP address of the node as belonging to an asset of the asset type.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
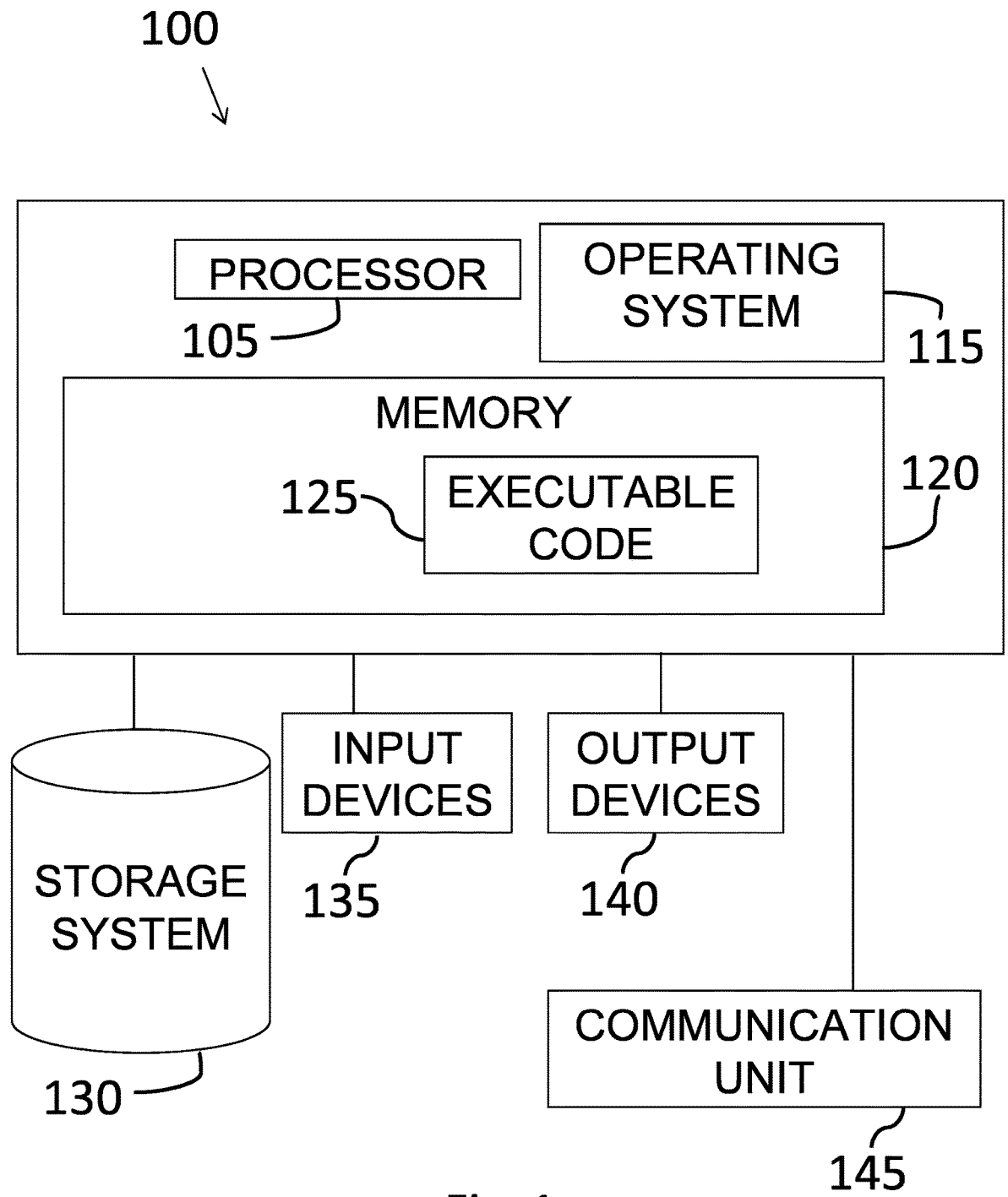
FIG. 1 shows a schematic block diagram of an example computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Reference is made to FIG. 1, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet.

Controller 105 may be configured to execute program code to perform operations described herein. The computer network described herein may include one or more computing device(s) 100, for example, to act as the various devices or the components shown in FIG. 2.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of similar and/or different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPUs), a plurality of graphics processing units (GPUs), or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device.

Figure 2:
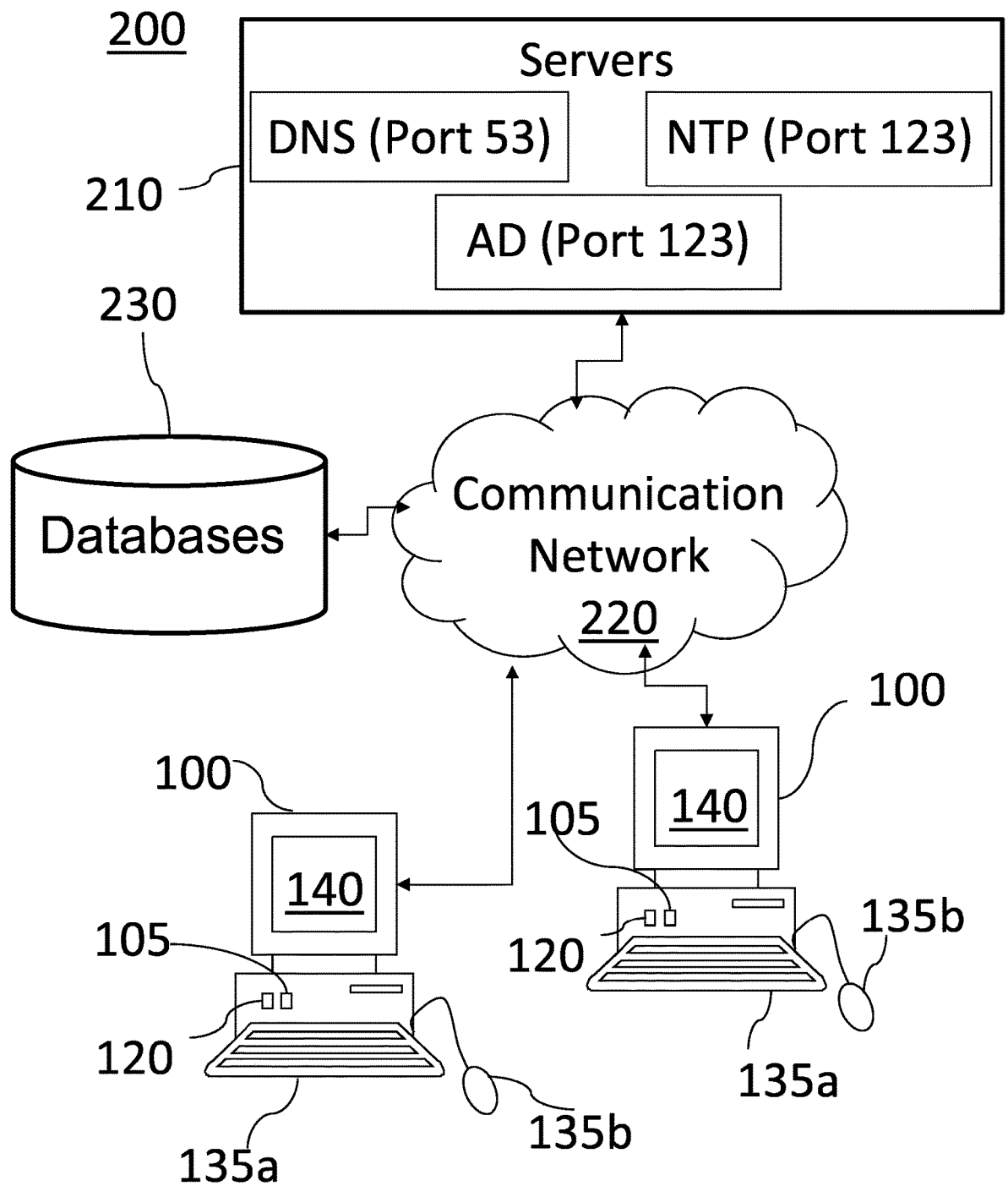
FIG. 2 shows a schematic illustration of a system for discovering computer network assets, according to some embodiments of the invention.

Reference is made to FIG. 2, which is a schematic illustration of a system of discovering computer network assets, according to some embodiments of the invention. Some elements in FIG. 2 may have similar components to those shown in FIG. 1; e.g. servers 210 may have components such as in FIG. 1; and computers 100 in FIG. 2 may be analogous to computer 100 in FIG. 1.

System 200 may include one or more computing devices 100, servers 210 and databases 230, all of which are connected via a communication network 220. For example, servers 210 may include a Domain Name System (DNS) server, a Network Time Protocol (NTP) server, a mail server, a Dynamic Host Configuration Protocol (DHCP) server, a web server, a file server, and Active Directory (AD) servers.

One or more memories (e.g., 120 of FIGS. 1 and 2) may store instructions to perform or executable code (e.g., 125 of FIG. 1) of an algorithm for discovering network assets from (e.g., small) network samples. One or more processors (e.g., 105 of FIGS. 1 and 2) of computing device 100 may be a node of the network 220 and execute instructions or executable code 125 and implement the algorithm. While computing device 100 is described herein as executing a method for discovering network assets from network samples, any one or more of other devices may additionally or alternatively execute those computations, e.g., remote servers or servers external to the local network providing computer system resources, such as storage and computing.

Communication network 220, which connects computing device 100, servers 210 and databases 230, may be any public or private network such as the Internet. Computing device 100 may access network 220 through a communication unit (e.g., communication unit 145 as shown in FIG. 1).

According to some embodiments of the invention, various devices or combinations of devices may be used in system 200, e.g., computers 100 may be laptops, mobile phones, wearable communication devices, etc.

Figure 3:
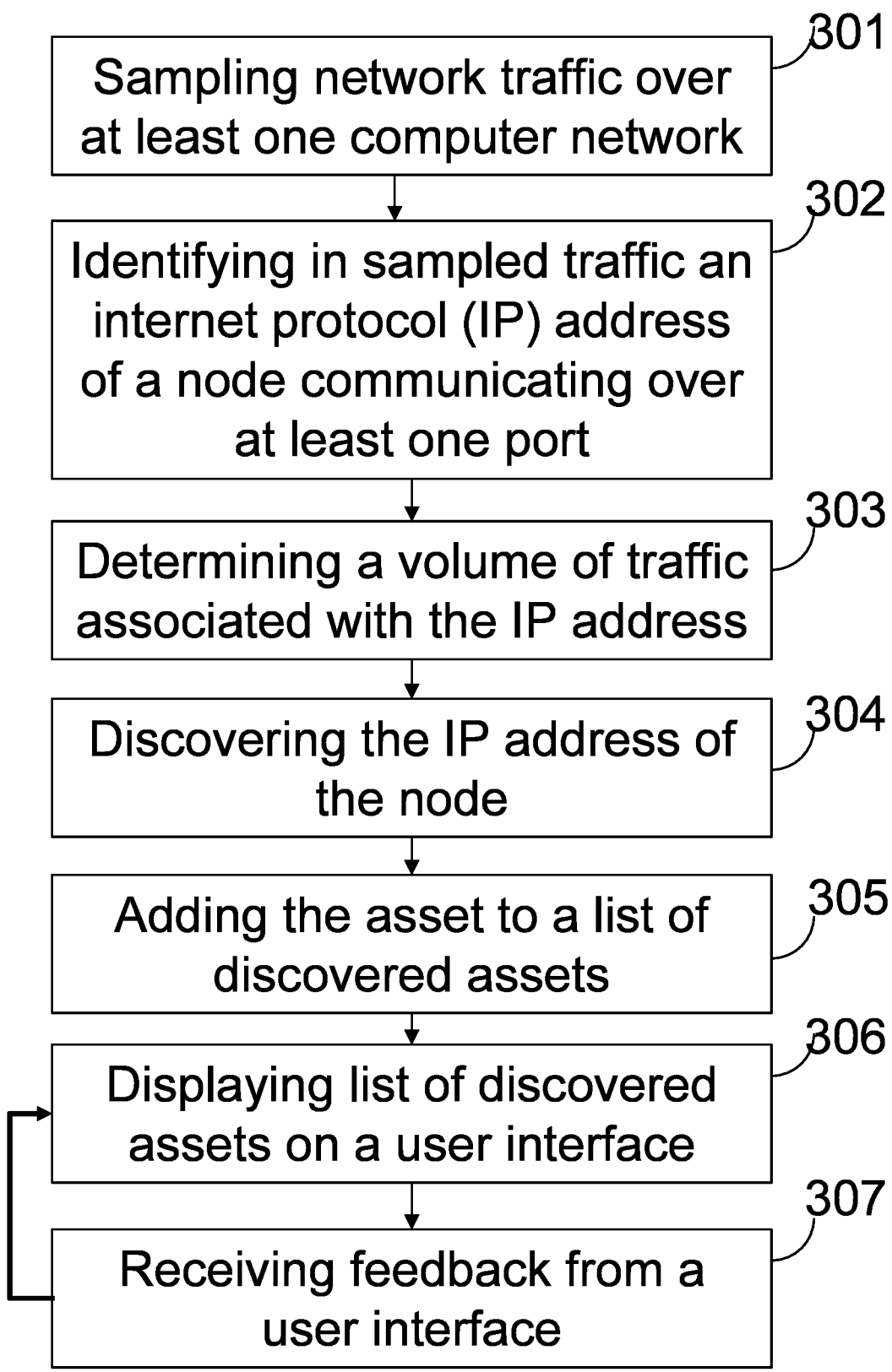
FIG. 3 shows a flowchart of a method of discovering network assets from network samples, according to some embodiments of the invention.

Reference is now made to FIG. 3 which is a flowchart of a method for discovering network assets from network samples, according to some embodiments of the invention.

The operation(s) of FIG. 3 may be performed using devices or components described in FIGS. 1 and 2. For example, the operation(s) of FIG. 3 may be performed using processor 105 of computing device 100 of FIGS. 1 and 2. Other devices or systems may also be used.

In operation 301, one or more processors 105 may execute instructions stored in one or more memories 120 to sample network traffic over at least one communication network 220. For example, processors 105 may sample network traffic from network gateways (e.g., Firewall and/or switch) using various sampling protocols (e.g., sFlow and NetFlow sampling protocols). One or more processors 105 may create a list of asset types and their associated ports (e.g., {DNS: [53], NTP: [123]}).

One or more processors 105 may use data structure input_df as the network samples raw data collected from the network gateways in subsequent operations for discovering network assets (e.g., subsequent operations of FIG. 3).

In some embodiments, the received network samples are enriched by adding details for each communication. For example, geographical/organization details may be inferred from the IP address, e.g., by using a look up table that indicates ranges of IP addresses that belong to different geographical locations or different organizations. In FIG. 2, the computing device 100 and each of the DNS, NTP and AD ports may have a different IP address.

In operation 302, one or more processors 105 may execute instructions stored in one or more memories 120 to identify in sampled traffic an internet protocol (IP) address of a specific node(e.g., the node may be selected randomly) that is communicating over at least one port, wherein the at least one port is associated with an asset type. For example, each port may be associated with one asset type such that each port is associated with a different asset type.

An asset type may have multiple ports related to the asset type, for example, Active Directory (AD) may have a Lightweight Directory Access Protocol (LDAP) for port 389 and Kerberos at port 88, where it may use them both, or only one of them, or a different related port.

A node may be a server, a workstation or computing device, such as computing device 100, or any other device capable of communicating over communication network 220, such as a laptop, mobile phone, a smart watch or any other wearable communication device. By way of example, processor 105 may identify in sampled traffic an IP address of a node communicating over port 53, where port 53 is associated with a DNS server. Similarly, processor 105 may identify in sampled traffic an IP address of a node communicating over port 123, where port 123 is associated with an NTP server. One or more processors 105 may identify in sampled traffic an internal IP address based on the IP address belonging to one or more reserved IP address blocks (e.g., 10.x.x.x, etc.). For example, in communication network 220, at least one of processors 105, port 53, and port 123 may be associated with an IP address.

An external IP address may be identified in sampled traffic, based on the IP address belonging to a node with a high volume of communication with a public provider (e.g., Microsoft™, Amazon™, Facebook™, or Google™).

In some embodiments, the main gateways of the communication network 220 are continuously sampled. A user of system 200 may choose to sample additional gateways such as switches and firewalls of the communication network 220. In some embodiments, the nodes such as computing devices 100 or workstation nodes of the network are not sampled.

In operation 303, one or more processors 105 may execute instructions stored in one or more memories 120 to determine a volume of traffic associated with the IP address of the node communicating over the at least one port associated with the asset type. For example, one or more processors 105 may determine the volume of traffic as the number of packets per second associated with the IP address of the node communicating over the at least one port associated with the asset type. One or more processors 105 may determine the volume of traffic as the number of bytes per second associated with the IP address of the node communicating over the at least one port associated with the asset type. Other measures of volume may be used.

In some embodiments, one or more processors 105 determine asset candidates by checking the volume of traffic passing through IP addresses in the network. A dynamic threshold may be determined in accordance with the number of assets in the network and/or the volume of communication in the network such that asset candidates in correlation to the dynamic threshold.

In operation 304, one or more processors 105 may execute instructions stored in one or more memories 120 to determine or discover an asset candidate by the IP address of the node that belongs to an asset type, based on the volume of traffic exceeding a threshold such as a dynamic threshold. For instance, a dynamic threshold may be determined for each associated asset type based on the volume of communication in the network.

Each asset type may be discovered based on its asset ports. For example, the DNS server may be discovered based on traffic passing port 53 and the NTP server may be discovered based on port 123.

Discovering based on the volume of traffic may be based on the volume of internal communication over the at least one port associated with the asset type that exceeds a port threshold (e.g., a threshold for traffic over a particular port) for the asset type. The volume of internal communication over the at least one port may be determined as the volume of traffic associated with internal IP addresses of nodes communicating over the at least one port.

One or more processors 105 may determine the port threshold, using the list of asset types and their associated ports and a maximum traffic volume for each asset type. One or more processors 105 may reduce the port threshold iteratively (e.g., reduced from a predefined value). Maximum traffic volume for the asset type may be determined, by one or more processors 105, as a fraction of a total volume of traffic through all ports for a time duration used to sample network traffic.

For example, one or more processors 105 may determine an initial value of the port threshold equals 95% of the maximum traffic volume for the asset type. One or more processors 105 may determine whether or not the volume of internal communication (e.g., volume of all packets) exceeds the port threshold. If the volume of internal communication exceeds the port threshold, one or more processors 105 may determine that the IP addresses associated with the internal communication operates differently and issue an alert. Otherwise, one or more processors 105 may decrease the value of the port threshold, and determine whether or not the volume of internal communication exceeds the port threshold.

The one or more processors 105 may decrease the value of the port threshold to detect asset candidates until the one or more processors 105 determine that the volume of internal communication exceeds the port threshold (e.g., corresponding to an asset candidate). For example, the one or more processors 105 may decrease the value of the port threshold in decrements of 1% of maximum traffic volume for the asset type until the one or more processors 105 determine that the volume of internal communication exceeds the port threshold and thereby determine at least one asset candidate having sufficient traffic volume for an asset.

In some embodiments, the port threshold is determined, by the one or more processors 105, based on a ratio between the volume of traffic through the port and the total volume of traffic through other ports. For example, port thresholds for several ports associated with an asset may be determined for large volume of traffic via a specific port as 95% of volume of traffic through the specific port and 5% of total volume of traffic through other ports.

The one or more processors 105 may determine or calculate the dynamic threshold, for example based on the total volume of traffic over the computer network and based on the asset type. For example, one or more processors 105 may determine the dynamic threshold, based on the port threshold of the asset type. For example, one or more processors 105 may determine the dynamic threshold to be equal to the value of the port threshold of the asset type divided by the number of nodes with internal IP addresses communicating over the port of the asset type.

According to some embodiments, the one or more processors 105 add to the list of discovered assets, an IP address of at least one subnetwork in communication with the server over the at least one server port, a volume of outbound traffic over the at least one server port, a volume of inbound traffic over the at least one server port and a volume of internal traffic over the at least one server port, where the volume of traffic between the server and the at least one subnetwork exceeds the dynamic threshold.

According to some embodiments, traffic is sampled over a computer network, and an IP address of a node communicating over a port in the sampled traffic is determined, where the at least one port is associated with an asset type. The volume of traffic associated with the IP address of the node communicating over the at least one port is checked to determine if it exceeds a dynamic threshold, and if so adding the asset to a list of discovered assets based on determination of the IP address of the node as belonging to an asset of the asset type.

In operation 305, one or more processors 105 may execute instructions stored in one or more memories 120 to add the asset to a list of discovered assets.

In operation 306, one or more processors 105 may execute instructions stored in one or more memories 120 to display the list of discovered assets on a user interface. Processor 105 may provide the list of discovered assets on output devices 140 (e.g., a display).

In operation 307, one or more processors 105 may execute instructions stored in one or more memories 120 to receive feedback from a user interface to modify the list of discovered assets. The list of discovered assets may be presented on a dedicated page in a dashboard, that may be editable by a user. A user has an option to give feedback using input devices 135 (e.g., as in FIGS. 1 and 2). For example, the user may update the list of discovered assets, if a known error in the discovery is observed. For example, a user may report that a node classified as belonging to a specific asset type indeed belongs to the asset type, or that it actually should be of a different asset type, or that it is not an asset at all, where the user may identify the node by its IP address displayed on the user interface. By way of example, a user may report that a node classified as a DNS server is indeed a DNS server, or that it actually should be an AD server, or that it is not an asset at all, where the user identifies the node by its IP address displayed on the user interface and/or where the IP address is not an IP address of a DNS server on system 200.

The user may edit the list of discovered assets on the dedicated page in a dashboard, and use the information provided on the dedicated page in other pages in the dashboard, for example to run queries on the assets. After operation 307, one or more processors 105 may execute operation 306 to display the modified list of discovered assets on the user interface. The modified list of discovered assets may be presented on the dedicated page in the dashboard. This user feedback may be used to update future runs of asset discovery using method shown in FIG. 3.

Figure 4:
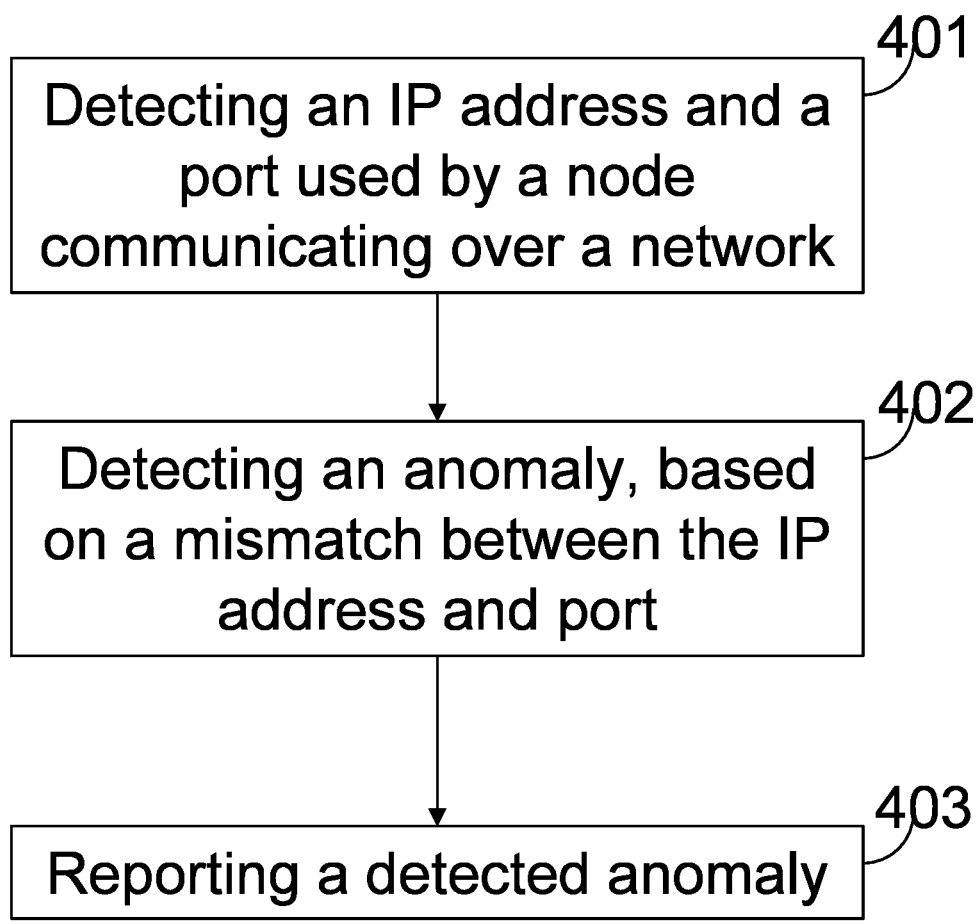
FIG. 4 shows a flowchart of a method of anomaly detection, according to some embodiments of the invention.

Reference is now made to FIG. 4 which is a flowchart of a method of anomaly detection, according to some embodiments of the invention.

The operation(s) of FIG. 4 may be performed using devices or components disclosed in reference to FIGS. 1 and 2. For example, the operation(s) of FIG. 2 may be performed using processor 105 of computing device 100 of FIGS. 1 and 2. Other devices or systems may also be used.

In operation 401, one or more processors 105 may detect a node of specific IP address communicating over a port in the network.

In operation 402, one or more processors 105 may detect an anomaly, based on a mismatch between the asset type and port used or the node and the asset port used. An anomaly may be determined upon detecting an asset communicating differently than the characteristics of that asset. For example, one or more processors 105 may detect an anomaly based on detecting an asset communicating over at least one port not associated with the asset type of the asset.

An anomaly may also be determined upon detecting an IP address communicating as an asset. For example, one or more processors 105 may detect an anomaly based on detecting an external IP address of a node using an asset configured for internal communication.

Alternatively, one or more processors 105 may detect an anomaly based on detecting internal traffic of an asset type that is intended for one or more internal nodes being communicated to one or more external nodes (e.g., outside of the communication network 220). For example, one or more processors 105 may detect an anomaly based on detecting DNS communications between two nodes where neither node is one of the discovered internal DNS assets. Alternatively, one or more processors 105 may detect communication over port 389 (AD) which is not through the discovered AD asset.

Alternatively, one or more processors 105 may detect an anomaly based on detecting traffic of an asset type being communicated to one or more external nodes (e.g., outside of the communication network 220). not through an asset of the asset type. For example, one or more processors 105 may detect Mail communications directed to an external node going through an asset that is not the internal Mail asset. Alternatively, one or more processors 105 may detect an anomaly based on detecting communication over port 53 (DNS) with the external node (e.g., located in another country such as France) which is not through the discovered DNS asset.

Alternatively, one or more processors 105 may detect an anomaly based on detecting direct communication from an internal node to the external node. For example, one or more processors 105 may detect Mail communications directly from a node to the external node.

Alternatively, one or more processors 105 may detect an anomaly based on detecting an external node using an asset port configured for internal communication. For example, detecting communication over DHCP with the external node (e.g., in France) which should be only inside the network, according to some embodiments of the invention.

Alternatively, one or more processors 105 may detect an anomaly based on detecting an internal IP address of a node communicating over at least one port which should be used only for external communication.

Alternatively, one or more processors 105 may detect an anomaly based on detecting an external IP address of a node communicating over at least one port which should be used only for internal communications.

In operation 403, one or more processors 105 may report a detected anomaly. For example, one or more processors 105 may report an anomaly based on detecting an asset communicating over at least one port not associated with its asset type by presenting the IP address, and potentially additional details, of the asset and a number of the port on a dedicated page for anomalies on the user-interface.

Alternatively, one or more processors 105 may report an anomaly based on detecting internal traffic of an asset type that is intended for one or more internal nodes being communicated to one or more external nodes (e.g., outside of the communication network 220). For example, one or more processors 105 may report an anomaly based on detecting DNS communications between two nodes where neither node is one of the discovered internal DNS assets by presenting the IP address, and potentially additional details, of the nodes and a number of the port on a dedicated page for anomalies on the user-interface. Alternatively, one or more processors 105 may report communication over port 389 (AD) which is not through the discovered AD asset by presenting the IP address of this node that is not an AD asset and the number of the port (e.g., 389) on a dedicated page for anomalies on the user-interface.

Alternatively, one or more processors 105 may report an anomaly based on detecting traffic of an asset type being communicated to one or more external nodes (e.g., outside of the communication network 220). not through an asset of the asset type by presenting the IP address, and potentially additional details, of the nodes and a number of the port on a dedicated page for anomalies on the user-interface. For example, one or more processors 105 may report Mail communications to the external node going through an asset that is not the internal Mail asset by presenting the IP address, and potentially additional details, of the nodes involved and a number of the port on a dedicated page for anomalies on the user-interface. Alternatively, one or more processors 105 may report an anomaly based on detecting communication over port 53 (DNS) with the external node (e.g., in France) which is not through the discovered DNS asset by presenting the IP address, and potentially additional details, of the nodes involved and a number of the port on a dedicated page for anomalies on the user-interface.

Alternatively, one or more processors 105 may report an anomaly based on detecting direct communication from an internal node to the external node. For example, one or more processors 105 may report Mail communications directly from an internal node to the external node.

Alternatively, one or more processors 105 may report an anomaly based on detecting an internal IP address of a node communicating over at least one port which may only be used for external communication with an asset.

Alternatively, one or more processors 105 may report an anomaly based on detecting an external IP address of a node communicating over at least one port which may only be used for internal communication with an asset.

Alternatively, one or more processors 105 may report an anomaly based on detecting traffic of an asset type not being communicated using an asset of the asset type. For example, one or more processors 105 may detect Mail communications to the external node going through an asset that is not the internal Mail asset.

Alternatively, one or more processors 105 may report an anomaly based on detecting direct communication from an internal node to the external node. For example, one or more processors 105 may detect Mail communications directly from an internal node to the external node.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of discovering computer network assets, the method comprising:
   identifying, by a processor, in sampled traffic over at least one computer network, an internet protocol (IP) address of a node communicating over at least one port, wherein the at least one port is associated with an asset type;
   determining, by the processor, a volume of traffic associated with the IP address of the node communicating over the at least one port;
   discovering, by the processor, the IP address of the node as belonging to an asset of the asset type, based on the volume of traffic exceeding a dynamic threshold and based on volume of internal communication over the at least one port associated with the asset type that exceeds a port threshold; and
   adding the asset, by the processor, to a list of discovered assets,
   wherein the dynamic threshold is determined, by the processor, based on a ratio between the port threshold and a number of nodes with internal IP addresses communicating over the at least one port.

2. The method of claim 1, wherein the port threshold is determined, by the processor, based on a ratio between volume of traffic through the port and total volume of traffic through other ports.

3. The method of claim 1, wherein the dynamic threshold is determined, by the processor, based on total volume of traffic over the computer network and based on the asset type.

4. The method of claim 1, comprising detecting, by the processor, an anomaly based on detecting an asset communicating over at least one port not associated with the asset type of the asset.

5. The method of claim 1, comprising detecting, by the processor, an anomaly based on detecting an internal IP address of a node using an asset configured for external communication.

6. The method of claim 1, comprising detecting, by the processor, an anomaly based on detecting an external IP address of a node using an asset configured for internal communication.

7. The method of claim 1, comprising detecting, by the processor, an anomaly based on detecting an internal IP address of a node communicating over at least one port configured for external communication.

8. The method of claim 1, comprising detecting, by the processor, an anomaly based on detecting an external IP address of a node communicating over at least one port configured for internal communication.

9. The method of claim 1, wherein adding the asset, byte processor, to the list of discovered assets comprises: adding the IP address of the asset and the asset type to the list of discovered assets.

10. The method of claim 9, wherein adding an asset, byte processor, tithe list of discovered assets comprises: adding the IP address of the asset and a list of at least one server port, wherein the volume of traffic of the asset over the at least one server port exceeds the dynamic threshold.

11. The method of claim 10, comprising adding, by the processor, to the list of discovered assets, an IP address of at least one subnetwork in communication with at least one server over the at least one server port, a volume of outbound traffic over the at least one server port, a volume of inbound traffic over the at least one server port and a volume of internal traffic over the at least one server port, wherein the volume of traffic between the server and the at least one subnetwork exceeds the dynamic threshold.

12. A system for discovering computer network assets comprising:
a processor configured to:
identify in sampled traffic over at least one computer network, an internet protocol (IP) address of a node communicating over at least one port, wherein the at least one port is associated with an asset type;
determine a volume of traffic associated with the IP address of the node communicating over the at least one port;
discover the IP address of the node as belonging to an asset of the asset type, based on the volume of traffic exceeding a dynamic threshold and based on volume of internal communication over the at least one port associated with the asset type that exceeds a port threshold; and
add the asset to a list of discovered assets,
wherein the dynamic threshold is determined, by the processor, based on a ratio between the port threshold and a number of nodes with internal IP addresses communicating over the at least one port.

13. The system of claim 12, wherein the processor is configured to determine the port threshold, based on a ratio between volume of traffic through the port and total volume of traffic through other ports.

14. The system of claim 12, wherein the processor is configured to determine the dynamic threshold, based on total volume of traffic over the computer network and based on the asset type.

15. The system of claim 12, wherein the processor is configured to detect an anomaly based on detecting at least one of: an asset communicating over at least one port not associated with the asset type of the asset, an internal IP address of a node using an asset configured for external communication, an external IP address of a node using an asset configured for internal communication.

16. The system of claim 12, wherein the processor is configured to detect an anomaly based on detecting at least one of: an internal [P address of a node communicating over at least one port configured for external communication, and an external IP address of a node communicating over at least one port configured for internal communication.

17. The system of claim 16, wherein the processor is configured to add an asset to the list of discovered assets, comprising: adding the IP address of the asset and a list of at least one server port, wherein the volume of traffic of the asset over the at least one server port exceeds the dynamic threshold.

18. A method of determining computer network assets, the method comprising:
sampling, by a processor, traffic over a computer network;
determining, by the processor, an internet protocol (IP) address of a node communicating over a port in the sampled traffic, wherein the at least one port is associated with an asset type;
checking, by the processor, if a volume of traffic associated with the IP address of the node communicating over the at least one port is exceeding a dynamic threshold; and
adding the asset, by the processor, to a list of discovered assets based on determination of the IP address of the node as belonging to an asset of the asset type when the volume of traffic is exceeding the dynamic threshold and based on volume of internal communication over the at least one port associated with the asset type that exceeds a port threshold,
wherein the dynamic threshold is determined, by the processor, based on a ratio between the port threshold and a number of nodes with internal IP addresses communicating over the at least one port.

* * * * *